Dec. 10, 1935.   P. DOSTAL   2,023,725
APPARATUS FOR THE PRESERVATION OF EGGS
Filed Aug. 24, 1933

Patented Dec. 10, 1935

2,023,725

UNITED STATES PATENT OFFICE 2,023,725

APPARATUS FOR THE PRESERVATION OF EGGS

Paula Dostal, Vienna, Austria

Application August 24, 1933, Serial No. 686,577
In Austria August 26, 1932

2 Claims. (Cl. 99—2)

It is not possible to preserve eggs and to maintain the same in fertile condition for a year or more with the known apparatuses for the preservation of eggs, in which the eggs stored in a receptacle are turned preferably at intervals of 24 hours in such a manner that the air bubble present in the skin enclosing the white of the egg is brought to the opposite surface of the egg after each time the egg is turned through 180°. The cause for this objection is that during the turning the air bubble always returns to the same point of the egg skin after one or several turning movements with the result that, if the eggs are stored for a relatively long time, the egg skin becomes brittle at the points at which the air bubble repeatedly comes into contact with the egg skin, in spite of the egg being periodically turned, and allows the air to penetrate at the points which have become brittle.

This objection is overcome according to the invention in that the container accommodating the eggs to be preserved, when being turned over, is at the same time rotated around two or more axles standing at an angle the one to the other, so that, by the axles rotating at different speeds, the air bubble can never come a second time to a point of the egg skin where it has already been during a period of rest.

It has been found by comparative tests, that the containers, which accommodate the eggs, must not be turned at uniform intervals, as was hitherto assumed necessary in order to obtain a good preservation, but that, if the storage lasts longer, the intervals between every two successive turning operations must always become shorter if the eggs are to be kept fresh and fertile.

A device for carrying out the method is illustrated by way of example in the accompanying drawing in which:—

Figure 1:
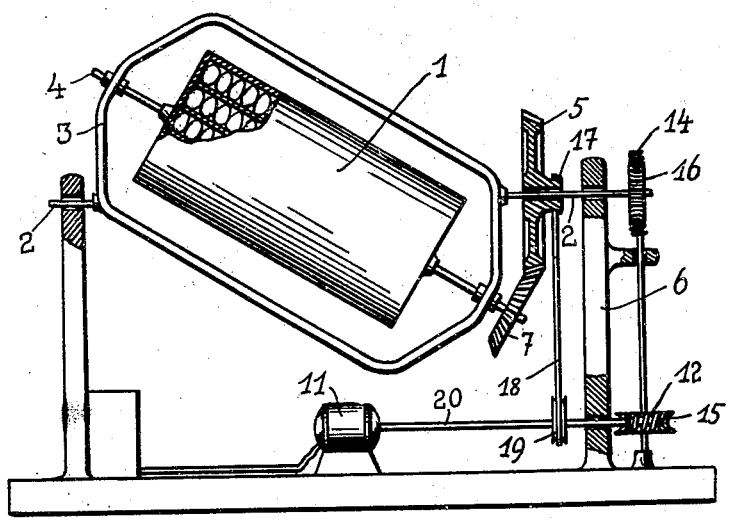
Fig. 1 shows the apparatus in elevation.
Figure 2:
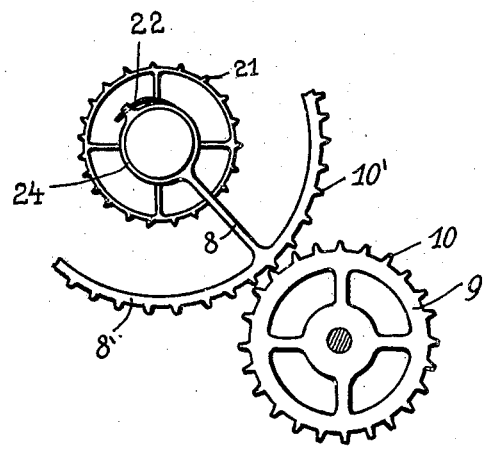
Fig. 2 is a diagrammatic view of a detail of the control clock actuating the apparatus.

The eggs to be preserved are accommodated in any suitable manner in a container 1 so that, by turning the container the eggs cannot be broken. The container 1 is rotatable around a shaft 4 within a frame 3. The frame 3 is also rotatable around a driving shaft 2 within a second frame 6. A bevel wheel 5 is loosely mounted on the driving shaft 2, driven by an electric motor 11 through the intermediary of a worm gearing 12, 14, 15 and 16, and meshes with a bevel wheel 7 keyed on the shaft 4. To the bevel wheel 5 a grooved pulley 17 may be fixed adapted to be rotated by means of a cord 18 from a grooved pulley 19 keyed on a motor shaft 20. The bevel wheel 5 may however be locked in the frame 6 by suitable means, such as levers or the like not shown on the drawing and thereby be prevented from independently rotating. By suitably selecting the diameters of the bevel wheels 5 and 7 it is possible, to adjust the turning movements of the container 1 carried out at certain intervals by the motor 11 in such a manner that the air bubbles contained in the eggs travel along a helical path within the egg skin during the rotation of the container.

The motor 11 is controlled by a control clock which allows the motor to start at certain intervals and to remain running until the container 1 has performed a rotation of for example 180° and which then breaks the circuit supplying current to the motor 11, and repeats this sequence of operation after the expiration of a further period. The control clock is equipped with a device, which renders it possible for the clock to run through the intervals expiring between every two consecutive control periods in gradually decreasing time. For this purpose a balance lever 8, provided on a rotatable ring 24, lengthening and shortening the balance spring 22 is mounted on the balance 21 of a known control clock. This lever 8 carries a toothed rim 8' with teeth 10' influenced by a feed wheel 9 driven by the movement of the control clock by suitable transmission wheels not shown in the drawing, in such a manner that the feed wheel rotates the distance of one tooth 10 in 24 hours. Thus, the balance spring is shortened every 24 hours and consequently the control clock runs quicker after every 24 hours than during the preceding 24 hours period. Thus the control for effecting the turning of the container 1 takes place in intervals gradually becoming shorter, and consequently the periods of rest of the container gradually become shorter as the period of storage lasts longer.

I claim:—

1. An apparatus for the preservation of eggs, comprising in combination a stationary frame, a driving shaft journalled in said stationary frame, means for rotating said driving shaft, a clock adapted to periodically engage and disengage said means, a rotary frame mounted on said driving shaft, a second shaft journalled in said rotary frame, an egg container mounted on said second shaft, a bevel wheel, keyed on said second shaft, a second bevel wheel loosely mounted on said driving shaft and meshing with said keyed bevel wheel, and means for rotating said second bevel wheel to rotate said container independently of said rotary frame.

2. In the apparatus as specified in claim 1, the clock, comprising in combination a movement, a control wheel adapted to be rotated one tooth by said movement every 24 hours, and an adjusting lever influenced by said control wheel to determine the running speed of the clock.

PAULA DOSTAL.